(12) United States Patent
Cho

(10) Patent No.: US 6,285,795 B1
(45) Date of Patent: Sep. 4, 2001

(54) METHOD AND APPARATUS FOR ENCODING/DECODING A BINARY SHAPE SIGNAL

(75) Inventor: Sung-Ryul Cho, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/216,833

(22) Filed: Dec. 21, 1998

(30) Foreign Application Priority Data

Apr. 24, 1998 (KR) ................................. 98-14642

(51) Int. Cl.[7] ................................................. G06K 9/36
(52) U.S. Cl. ................................................. 382/243
(58) Field of Search ................................. 382/232, 233, 382/237, 239, 241, 242, 243, 244, 245, 246, 247; 358/261.1, 261.2, 261.3

(56) References Cited

U.S. PATENT DOCUMENTS 4,369,463 * 1/1983 Anastassiou et al. ............. 382/232
5,298,992 3/1994 Pietras et al. .
5,555,323 * 9/1996 Hongu ................................ 382/247

FOREIGN PATENT DOCUMENTS 2291553 1/1996 (GB) .

* cited by examiner

*Primary Examiner*—Jose L. Couso
(74) *Attorney, Agent, or Firm*—Pennie & Edmonds LLP

(57) ABSTRACT

An apparatus encodes a binary shape signal and decodes the encoded binary shape signal by using a modified binary arithmetic coding and decoding method. In accordance with the modified binary arithmetic coding method, the binary shape signal is first scanned in a predetermined scanning order and a pixel value of its first scanned pixel is provided as one bit data. Then, the apparatus compares each of pixels in the binary shape signal with its precedingly scanned and adjacent pixel by using the scanned binary shape signal and produces a first or a second comparison signal. In response to the first or the second comparison signal, the apparatus assigns one of two mapping values to each of the pixels in the binary shape signal to thereby produce a mapping signal by using the assigned mapping values corresponding to the pixels in the binary shape signal. The mapping signal is arithmetically encoded based on probabilities corresponding to the two mapping values to thereby produce the encoded mapping signal. Finally, the one bit data and the encoded mapping signal are combined so that the encoded binary shape signal is outputted. At a decoding part, the encoded binary shape signal is reconstructed through the use of a reverse manner to the encoding process illustrated above.

11 Claims, 8 Drawing Sheets

FIG.3

|   |   |   |   |   |   |   |   |
|---|---|---|---|---|---|---|---|
| 1 | 1 | 1 | 1 | 1 | 1 | 0 | 0 |
| 1 | 1 | 1 | 1 | 1 | 1 | 0 | 0 |
| 1 | 1 | 1 | 1 | 1 | 1 | 1 | 0 |
| 0 | 0 | 1 | 1 | 1 | 1 | 1 | 0 |
| 0 | 0 | 0 | 1 | 1 | 1 | 1 | 1 |
| 0 | 0 | 0 | 1 | 1 | 1 | 1 | 1 |
| 0 | 0 | 0 | 0 | 1 | 1 | 1 | 1 |
| 0 | 0 | 0 | 0 | 1 | 1 | 1 | 1 |

(top-left cell labeled 50)

FIG.5A

| 0 | 0 | 0 | 0 | 0 | 0 | 1 | 0 |
|---|---|---|---|---|---|---|---|
| 0 | 0 | 0 | 0 | 0 | 0 | 1 | 0 |
| 0 | 0 | 0 | 0 | 0 | 0 | 0 | 1 |
| 1 | 0 | 1 | 0 | 0 | 0 | 0 | 1 |
| 0 | 0 | 0 | 1 | 0 | 0 | 0 | 0 |
| 0 | 0 | 0 | 1 | 0 | 0 | 0 | 0 |
| 0 | 0 | 0 | 0 | 1 | 0 | 0 | 0 |
| 0 | 0 | 0 | 0 | 1 | 0 | 0 | 0 |

FIG.5B

| 0 | 0 | 0 | 0 | 0 | 0 | 1 | 0 |
|---|---|---|---|---|---|---|---|
| 0 | 0 | 0 | 0 | 0 | 1 | 0 | 0 |
| 0 | 0 | 0 | 0 | 0 | 0 | 0 | 1 |
| 0 | 1 | 0 | 0 | 0 | 0 | 1 | 0 |
| 0 | 0 | 0 | 1 | 0 | 0 | 0 | 0 |
| 0 | 0 | 1 | 0 | 0 | 0 | 0 | 0 |
| 0 | 0 | 0 | 0 | 1 | 0 | 0 | 0 |
| 0 | 0 | 0 | 1 | 0 | 0 | 0 | 0 |

METHOD AND APPARATUS FOR ENCODING/DECODING A BINARY SHAPE SIGNAL

FIELD OF THE INVENTION

The present invention relates to a video encoding/decoding system; and, more particularly, to a method and an apparatus for efficiently encoding/decoding a binary shape signal by using a modified binary arithmetic coding technique.

DESCRIPTION OF THE PRIOR ART

A binary shape signal, representing the location and shape of an object, can be expressed as a binary alpha block (BAB) of, e.g., 16×16, binary pixels within a frame or video object plane (VOP), wherein each binary pixel has a binary value, e.g., 0 or 255, representing either a background pixel or an object pixel. A BAB can be encoded by using a conventional bit-map-based shape coding method such as a context-based arithmetic encoding (CAE) method.

For instance, for an intra-frame, a current BAB is encoded by using a conventional intra-CAE technique, wherein each pixel in the current BAB is arithmetically coded based on an intra-context comprised of a set of pixels selected from a current frame. In other words, when encoding the current BAB, pixels from neighboring BAB's are used to make up the intra-context. A border of width 2 around the current BAB is used in order to provide a current bordered BAB as depicted in FIG. 7. In FIG. 7, the pixels in the light area of the current bordered BAB are the part of the current BAB to be encoded and the pixels in the dark area of the current bordered BAB are the border pixels. These are obtained from the neighboring BAB's of the current BAB except for those marked '0' which are unknown at a decoding time. Based on the current bordered BAB, the intra-context is selected as shown in FIG. 6A. Therefore, in FIG. 6A, a shaded pixel, i.e., a pixel in the current BAB, is encoded by using its intra-context 10 comprised of, e.g., C0 to C9.

For an inter-frame, the current BAB may be coded by using either the intra-CAE or an inter-CAE technique depending on whichever CAE technique between the two generates a less amount of encoded data. According to the inter-CAE technique, an error representing a difference between the current BAB and each of predetermined candidate BAB's thereof included in a previous frame is calculated first and a most similar candidate BAB and a motion vector are found by a motion estimation technique, wherein the most similar candidate BAB represents a candidate BAB generating a least error among the candidate BAB's and the motion vector denotes a displacement between the current BAB and the most similar candidate BAB. Thereafter, each pixel in the current BAB is arithmetically coded based on an inter-context; and a motion vector difference (MVD) which represents a difference between the motion vector and a motion vector predictor (MVP) thereof is encoded by using, e.g., a variable length coding (VLC) scheme. Referring to FIG. 6B, the inter-context is composed of two subsets of pixels: a first subset of pixels 20A includes, e.g., C0 to C3, which are selected from pixels in the current frame in a manner similar to that used in the intra-CAE; and a second subset of pixels 20B includes, e.g., C4 to C8, which are chosen from the previous frame based on the motion vector. Namely, a border of width 1 around a motion compensated BAB, detected from the previous frame by using the motion vector, is utilized to supply a bordered motion compensated BAB as described in FIG. 8, wherein the light area corresponds to the motion compensated BAB and the dark area corresponds to the border. After the bordered motion compensated BAB is determined, the second subset of pixels including the binary pixels C4 to C8 is selected from the bordered motion compensated BAB.

Accordingly, either the intra-context or the inter-context is selected as illustrated above and a context number for each of the pixels in the current BAB is calculated based on its corresponding context. Once the context number for each of the pixels in the current BAB is ciphered, a probability corresponding to the context number is detected from a probability table containing predetermined probabilities assigned to various context numbers, e.g., $2^{10}$ context numbers calculated from the intra-context including C0 to C9 and $2^9$ context numbers computed based on the inter-context including C0 to C8, and the detected probability is arithmetically encoded to thereby produce an encoded binary shape signal. For further details of the CAE techniques and the MVD, reference may be made to *MPEG-4 Video Verification Model Version* 7.0, International Organization for Standardization, Coding of Moving Pictures and Associated Audio Information, ISO/IEC JTC1/SC29/WG11 MPEG97/N1642, Bristol, April 1997.

In order to further enhance the coding efficiency of the binary shape signal, one of the mode signals listed in Table 1 is assigned for each BAB.

TABLE 1

| Coding Modes | |
|---|---|
| mode 1 | MVD==0 && No Update |
| mode 2 | MVD!=0 && No Update |
| mode 3 | all 0 |
| mode 4 | all 255 |
| mode 5 | intra-CAE |
| mode 6 | MVD==0 && inter-CAE |
| mode 7 | MVD!=0 && inter-CAE |

Mode 1 represents that a MVD for a BAB is zero and the BAB can be represented by a most similar candidate BAB thereof, whereas mode 2 indicates that a MVD for a BAB has a value other than zero and the BAB can be represented by a most similar candidate BAB. For the BAB of mode 1 only, the mode signal is encoded; and the BAB of mode 2 is represented by the mode signal and the MVD thereof. In determining "No Update", a difference BAB is formed by a difference between each pixel of the most similar BAB and a corresponding pixel thereof in the current BAB; and it is checked whether an error of any of the 4×4 subblocks of 4×4 pixels included in the difference BAB is less than a predetermined threshold, said error of a subblock being, e.g., a sum of absolute pixel values within the subblock. If error values of all the subblocks are equal to or less than the predetermined threshold, the BAB is declared as of mode 1 or 2 depending on the value of the MVD thereof.

Similarly, if an error for any 4×4 subblock is equal to or less than the predetermined threshold when the pixels in a BAB are all changed to 0, the BAB is coded as an "all_0" mode, i.e., mode 3. If the error for any 4×4 subblock is equal to or less than the threshold when the pixels in a BAB are all changed to 255, the BAB is coded as an all_255 mode, i.e., mode 4. For a BAB of mode 3 or 4, only the mode signal is encoded for the BAB. When a BAB does not belong to any one of modes 1 to 4, "intra-CAE" or "inter-CAE" is employed for the coding of the BAB, wherein a BAB of mode 5 is represented by the mode signal and intra-CAE coded BAB data. A BAB of mode 6 is represented by the mode signal and inter-CAE coded BAB data; and a BAB of mode 7 is represented by the mode signal, inter-CAE coded BAB data and a MVD.

In MPEG-4, the mode determination scheme described above has been suggested in encoding a binary shape signal; and an exemplary method and apparatus for enabling the coding of the binary shape signal is disclosed in a commonly owned copending application, U.S. Ser. No. 08/984,033, filed on Dec. 2, 1997 and entitled "INTERLACED BINARY SHAPE CODING METHOD AND APPARATUS".

Since, however, the conventional CAE technique requires a large-sized memory storing the probability table containing the predetermined probabilities, i.e., $2^{10}$ probabilities for the intra-context and $2^9$ probabilities for the inter-context, and has a burden of the encoding complexity due to the calculation of a context number corresponding to each pixel in the binary shape signal and arithmetical coding of the binary shape signal based on the probability table, it would be difficult to effectively carry out the encoding process in a high speed.

SUMMARY OF THE INVENTION

It is, therefore, a primary object of the invention to provide a method and an apparatus for encoding/decoding a binary shape signal by using a modified binary arithmetic coding technique instead of a CAE technique to thereby achieve an improved and simplified coding of the binary shape signal.

In accordance with one aspect of the present invention, there is provided a method encoding a binary shape signal including M×N pixels with M and N being positive integers, respectively, and each pixel having one of two binary values, comprising the steps of:

(a) scanning the binary shape signal in a predetermined scanning order and providing one bit data representing a pixel value of a first scanned pixel;

(b) comparing a target pixel with its precedingly scanned and adjacent pixel, wherein the target pixel is selected among the M×N pixels;

(c) assigning one of two mapping values to the target pixel in conformity with the comparison result;

(d) repeating the steps (b) and (c) until all the M×N pixels are processed to thereby produce a mapping signal which includes assigned M×N mapping values corresponding to the M×N pixels in the binary shape signal;

(e) arithmetically encoding the mapping signal by using probabilities corresponding to the two mapping values to thereby produce the encoded mapping signal; and (f) multiplexing the one bit data and the encoded mapping signal to thereby generate the encoded binary shape signal.

In accordance with another aspect of the present invention, there is provided a method for decoding an encoded binary shape signal, comprising the steps of:

(a) separating the encoded binary shape signal into one bit data and an encoded mapping signal;

(b) arithmetically decoding the encoded mapping signal by using probabilities used in an encoding process to thereby produce a decoded mapping signal containing M×N mapping pixels with M and N being positive integers, respectively, each of the M×N mapping pixels having one of two mapping values; and (c) reconstructing a binary shape signal having M×N binary pixels, each pixel having one of two binary values, by using the one bit data and the decoded mapping signal.

BRIEF DESCRIPTION OF THE DRAWINGS

The above and other objects and features of the present invention will become apparent from the following description of preferred embodiments given in conjunction with the accompanying drawings, in which:

FIG. 3 depicts an exemplary block having 8×8 pixels therein;

FIGS. 5A and 5B illustrate mapping blocks of the block shown in FIG. 3 determined dependent on the pixel scanning order depicted in FIGS. 4A and 4B, respectively;

Figure 7:
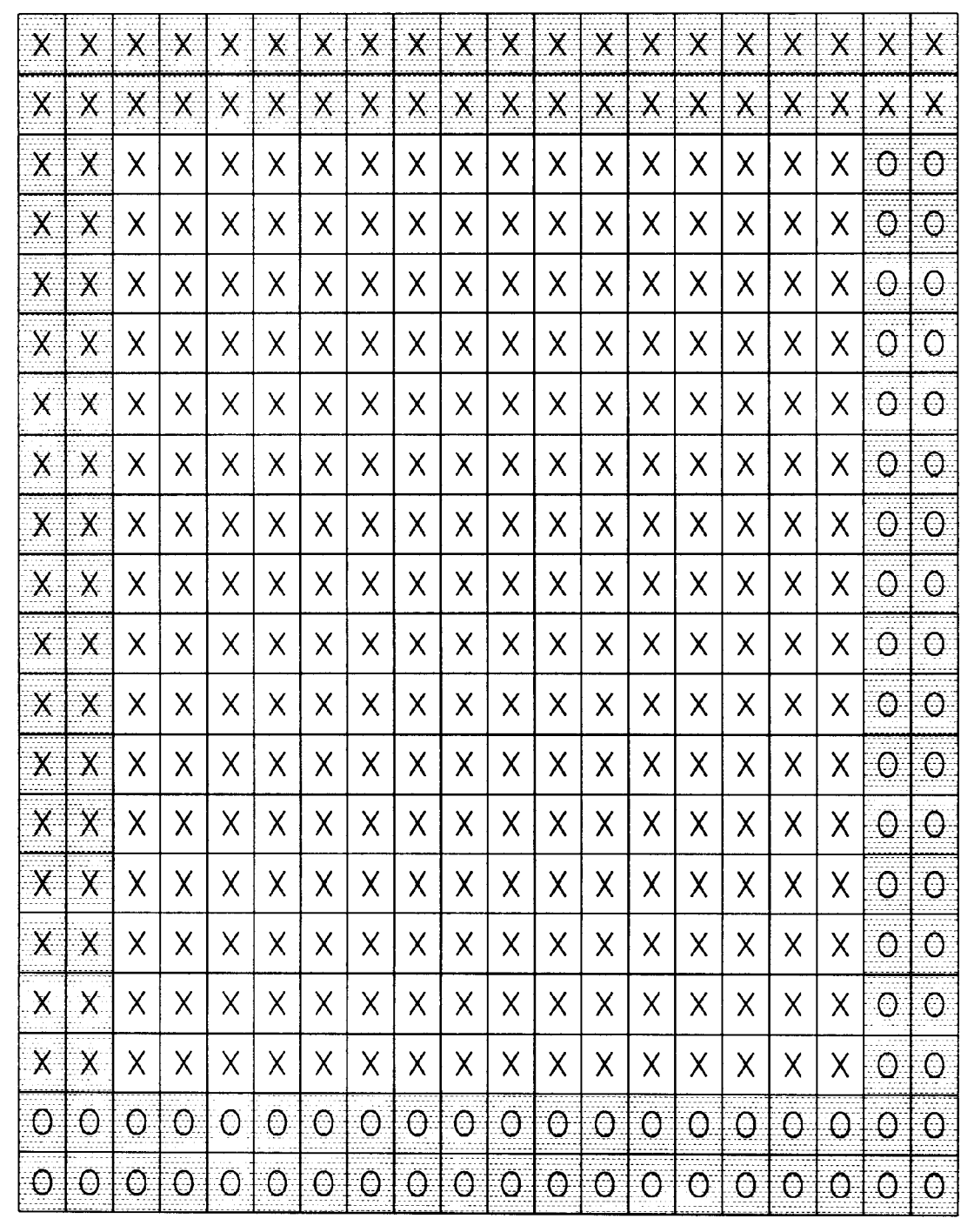

FIG. 7 describes a current bordered BAB; and

Figure 8:
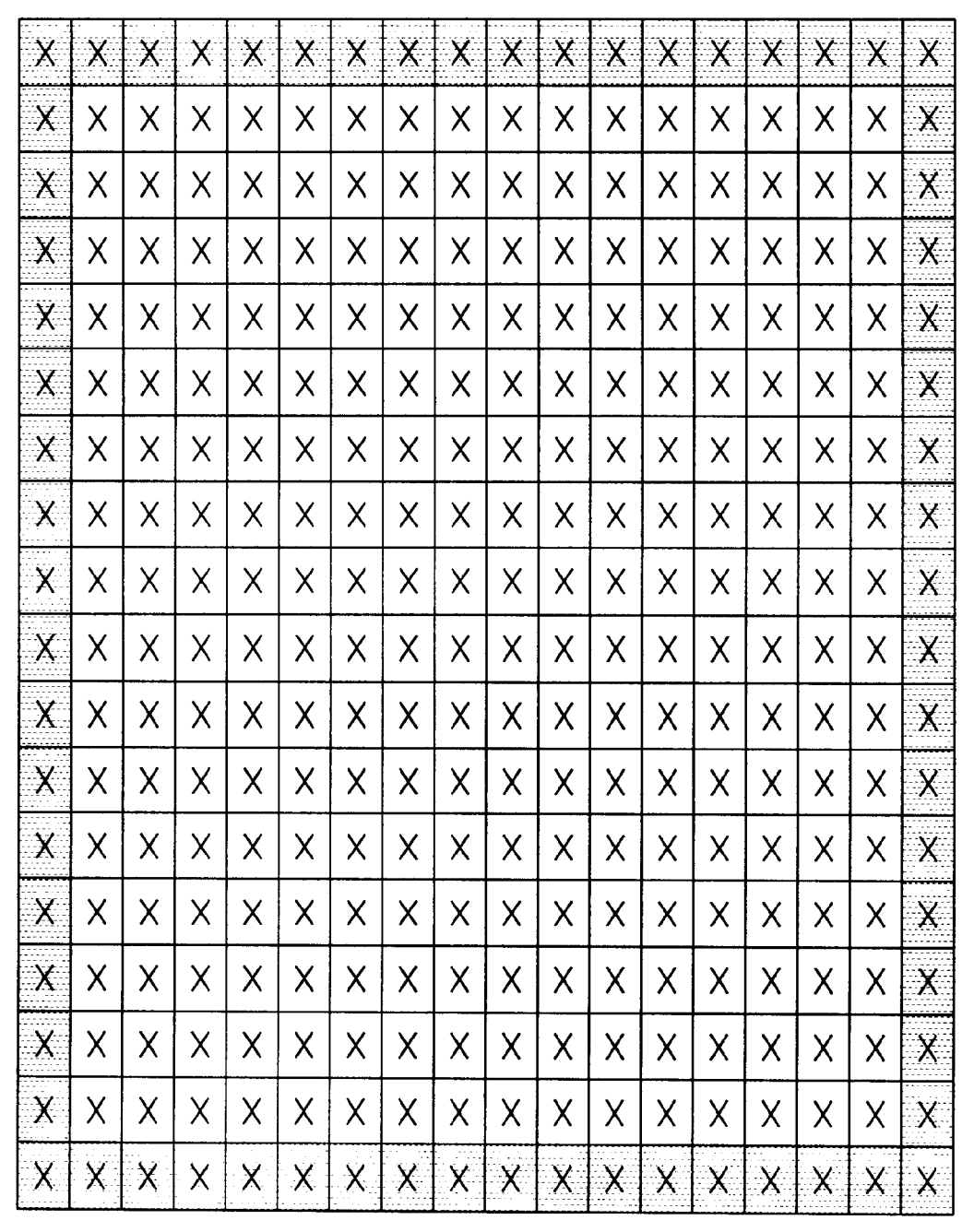

FIG. 8 presents a bordered motion compensated BAB.

DETAILED DESCRIPTION OF THE PREFERRED EMBODIMENTS

In accordance with the present invention, there is provided a method and an apparatus for efficiently encoding/decoding a binary shape signal on a picture-by-picture basis. The binary shape signal includes a previous and a current picture and each picture is partitioned into blocks of P×Q pixels with P and Q being positive integers, respectively, wherein each block is referred to as a binary alpha block (BAB). In a preferred embodiment of the invention, P and Q are both set to 16.

As shown in Table 1, in the conventional binary shape signal encoding process, if mode of a BAB is determined as mode 5, 6 or 7, the BAB is encoded by using the conventional CAE technique, i.e., the intra-CAE or the inter-CAE. However, in accordance with the present invention, a BAB of mode 5, 6 or 7 is encoded through the use of a modified binary arithmetic coding technique instead of the CAE technique.

Figure 1:
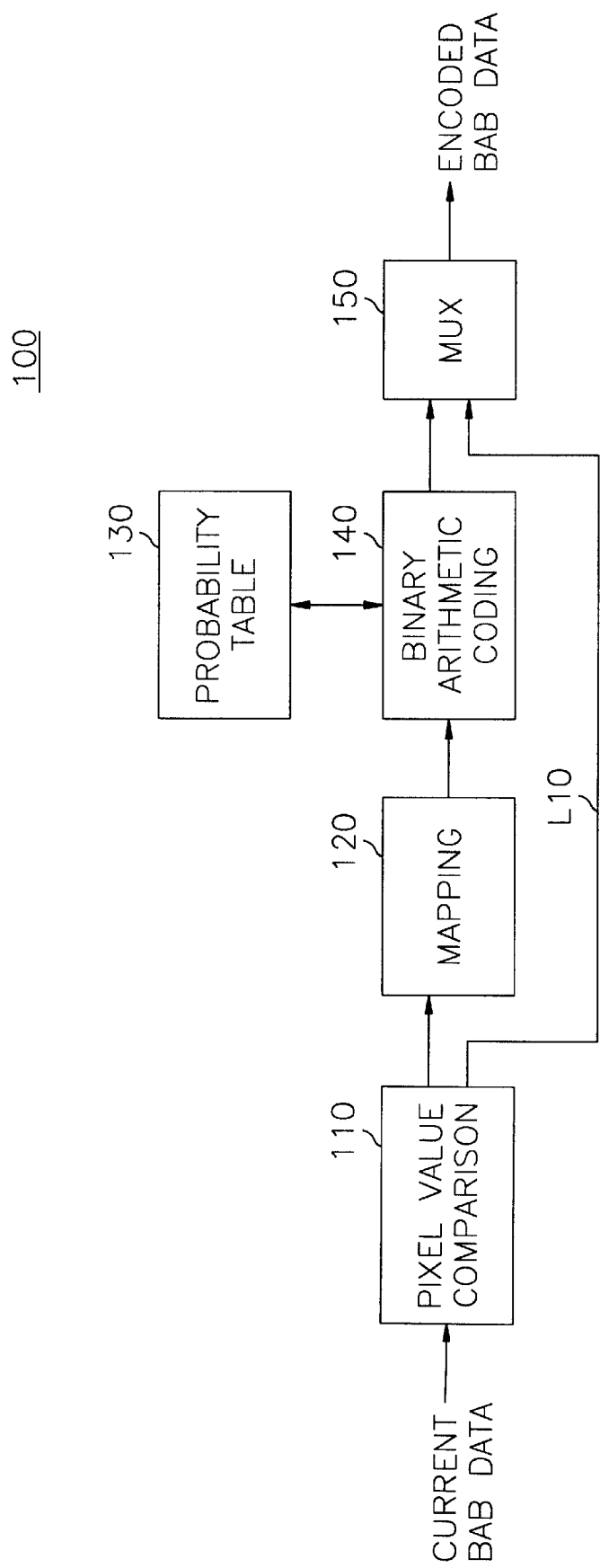
FIG. 1 represents a block diagram of a binary arithmetic coding apparatus in accordance with the present invention.

Referring to FIG. 1, there is provided a block diagram of a binary arithmetic coding apparatus 100 in accordance with the present invention.

The binary shape signal is inputted to a pixel value comparison block 110 on a BAB-by-BAB basis. In FIG. 3, there is exemplarily shown a BAB which is a boundary block having both background pixels and object pixels therein, wherein a background pixel and an object pixel are represented by binary values 0 and 1, respectively, and the binary value 1 corresponds to the binary value 255. Further, for the sake of simplicity, FIG. 3 represents a part of the BAB, having 8×8 pixels therein instead of 16×16 pixels.

Figure 4A:
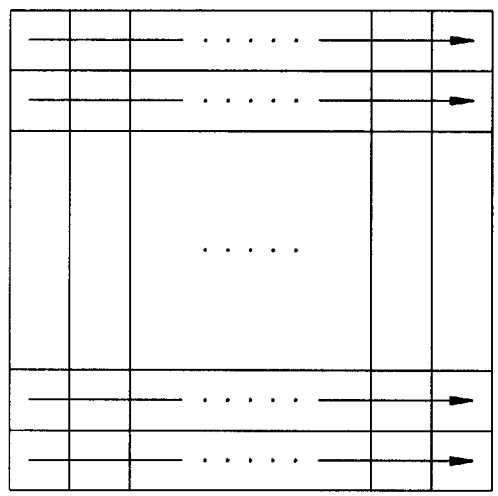
FIGS. 4A and 4B show pixel scanning order in accordance with a first and second embodiment of the present invention, respectively.
Figure 4B:
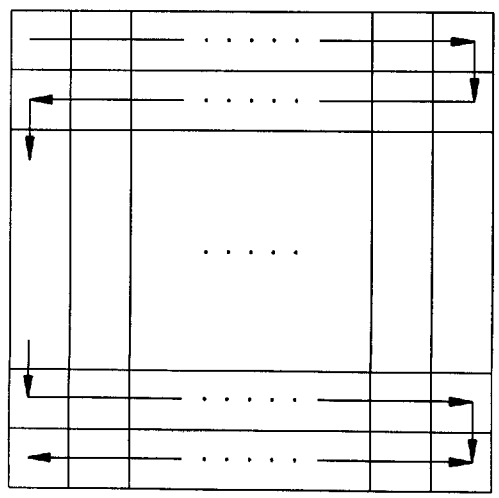
Figure 6A:
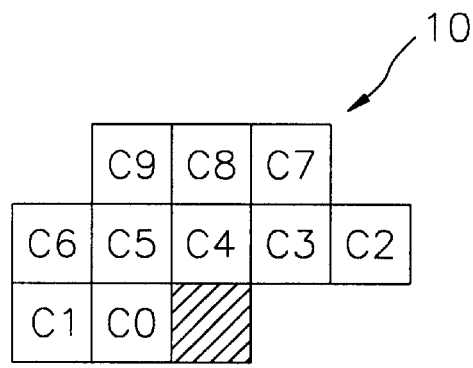
FIGS. 6A and 6B exemplify an intra-context and an inter-context, respectively.
Figure 6B:
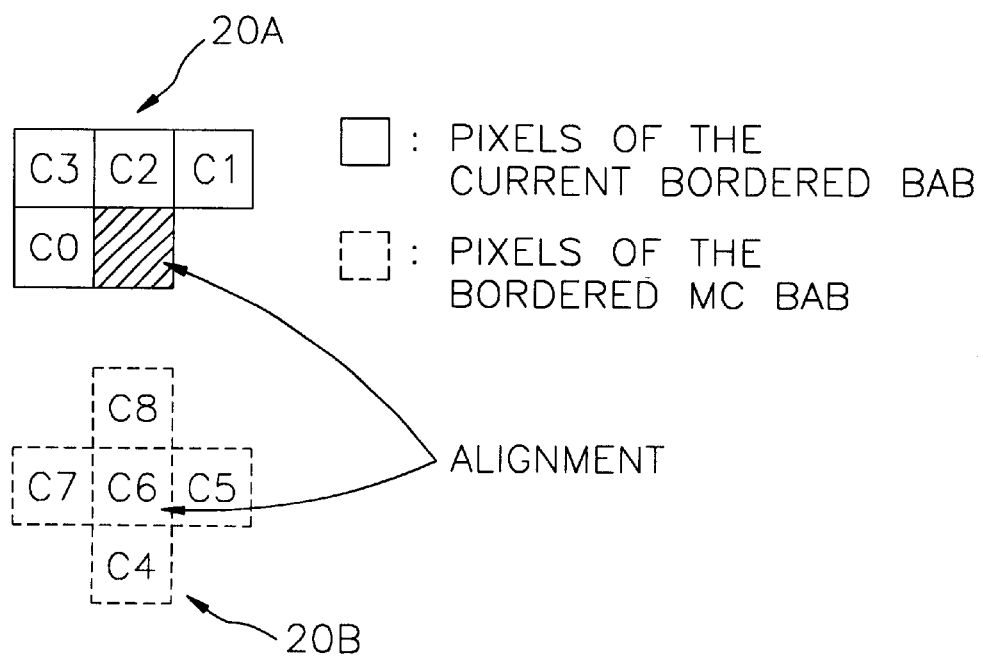

Here, assuming that the BAB shown in FIG. 3 is coupled to the pixel value comparison block 110 as a current BAB, the pixel value comparison block 110 compares pixels to check whether each adjacent two pixels in the current BAB have an identical binary value or not as scanning the current BAB in predetermined scanning order exemplarily shown in FIGS. 4A and 4B. That is, if a pixel has a same binary value as its precedingly scanned and adjacent pixel, a first comparison signal is generated to a mapping block 120 and, if otherwise, a second comparison signal is provided to the mapping block 120. Moreover, the pixel value comparison block 110 supplies one bit data representing the binary value of a left-top pixel 50 of the current BAB to a multiplexer (MUX) 150 via a line L10.

Then, the mapping block 120 produces mapping BAB data in response to the first or the second comparison signal corresponding to each pixel in the current BAB which is sequentially transferred from the pixel value comparison block 110. In order to generate the mapping BAB data, the mapping block 120 assigns a mapping value 0 to a target pixel in the current BAB if the first comparison signal is coupled thereto, i.e., the adjacent two pixels have a same binary value, and a mapping value 1 to the target pixel if the second comparison signal is fed thereto, i.e., the corresponding adjacent two pixels have different binary values.

Hereinafter, referring to FIGS. 3 to 5B, the pixel value comparison process and the mapping BAB data generation process performed at the pixel value comparison block 110 and the mapping block 120, respectively, will be illustrated.

In accordance with a first embodiment of the present invention related to FIGS. 4A and 5A, the pixel value comparison process is performed for each row of the current BAB as scanning the current BAB from left to right along an arrow as shown in FIG. 4A. For each row, except for the left-top pixel, each pixel in the current BAB is compared with its precedingly scanned and adjacent pixel. That is, a leftmost pixel is compared with its upper pixel and the remaining pixels are compared with their respective left-hand pixels. Then, at the mapping block 120, the left-top pixel obtains the mapping value 0 and each of the remaining pixels is mapped to one of the mapping values 0 and 1 in response to its corresponding comparison signal as illustrated above. As a result, the current BAB data described in FIG. 3 is converted to the mapping BAB data shown in FIG. 5A and the mapping BAB data has substantially increased number of 0's therein compared with the current BAB data.

In contrast, in accordance with a second embodiment of the present invention referring to FIGS. 4B and 5B, the pixel value comparison process is performed for each row of the current BAB as scanning the current BAB along an arrow as depicted in FIG. 4B. Therefore, the odd-numbered rows of the current BAB are scanned from left to right and the even-numbered rows are scanned from right to left. Along the arrow, each pixel in the current BAB is compared with its precedingly scanned and adjacent pixel. In other words, if a row is scanned from left to right, the leftmost pixel is compared with its upper pixel and the remaining pixels are compared with their respective left-hand pixels as in the first embodiment. On the other hand, if a row is scanned from right to left, a rightmost pixel is compared with its upper pixel and the remaining pixels are compared with their respective right-hand pixels. Through the use of the comparison result, the mapping block 120 assigns the mapping value 0 to the left-top pixel without regard to its original binary value and one of the mapping values 0 and 1 to each of the remaining pixels in the current BAB in response to a corresponding comparison signal as in the first embodiment of the present invention. As a result, the current BAB data shown in FIG. 3 is changed to the mapping BAB data described in FIG. 5B and this mapping BAB data has substantially increased number of 0's therein compared with the current BAB data in FIG. 3.

The mapping BAB data, generated from the mapping block 120 in accordance with the first or second embodiment of the present invention, is inputted to a binary arithmetic coding block 140.

The binary arithmetic coding block 140 encodes the mapping BAB data based on a probability table which is stored in a probability table block 130 and includes only two probabilities for the mapping values 0 and 1, respectively. For instance, when the mapping value 0 has a higher probability 240/256, the mapping value 1 has a lower probability 16/256. Therefore, since the probability corresponding to the mapping value 0 is substantially larger than that of the mapping value 1, the coding efficiency of the mapping BAB data is increased as the number of 0's in the mapping BAB data increases. The encoded mapping BAB data is coupled to the multiplexer 150.

At the multiplexer 150, the encoded mapping BAB data is combined with the one bit data fed thereto via the line L10 from the pixel value comparison block 110 to thereby produce encoded BAB data. Preferably, the one bit data is attached to a leftmost bit of an output bitstream expressing the encoded mapping BAB data derived at the binary arithmetic coding block 140. The encoded BAB data is transferred to a decoding part through a transmission channel (not shown).

In the above encoding process, since, when the left-top pixel in the current BAB is set to the mapping value 0, the mapping BAB data is much close to the probability of the mapping value 0, the bit length of the encoded mapping BAB data will be much shorter and, as a result, further improved coding efficiency can be achieved.

Figure 2:
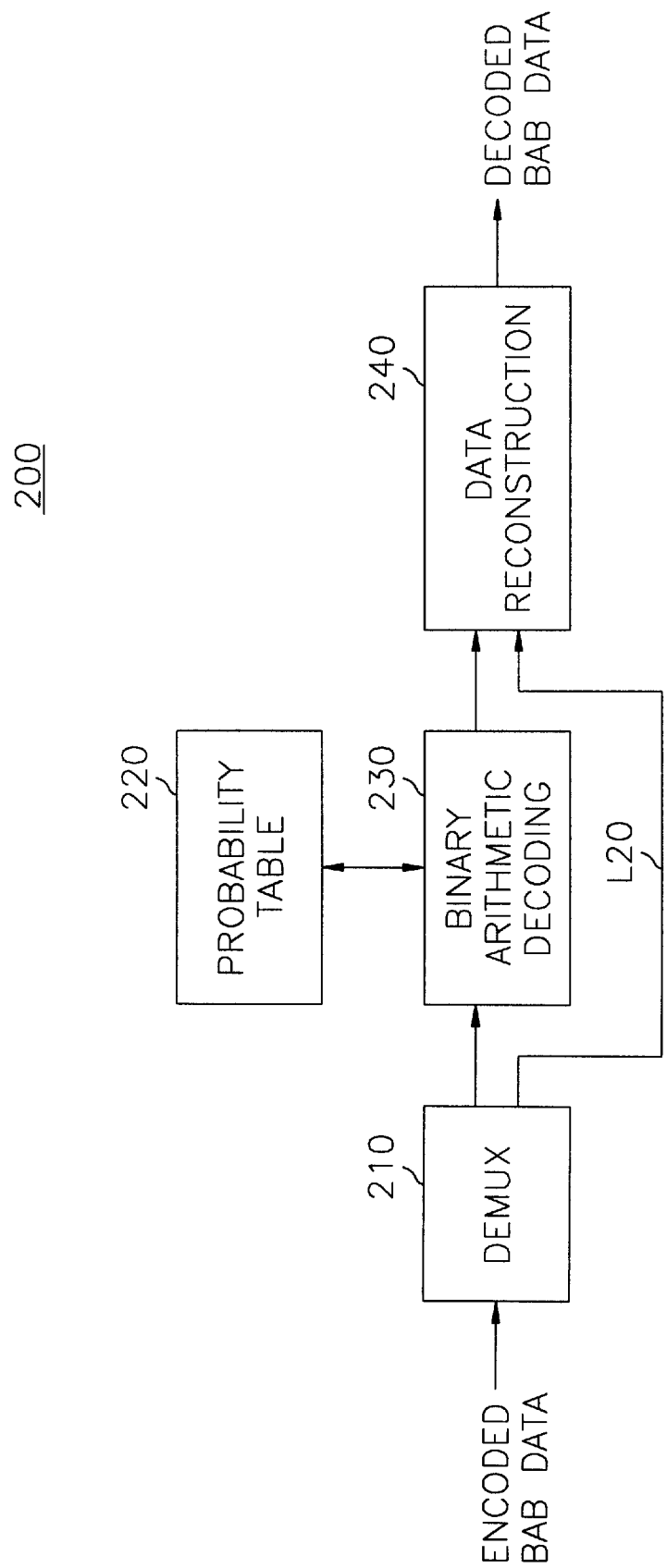
FIG. 2 provides a block diagram of a binary arithmetic decoding apparatus in accordance with the present invention.

Now, referring to FIG. 2, there is depicted a block diagram of a binary arithmetic decoding apparatus 200 in accordance with the present invention, which performs a decoding process in a reverse manner to the encoding process.

The encoded BAB data transferred via the transmission channel is inputted to a demultiplexer (DEMUX) 210 separating the encoded BAB data into the one bit data and the encoded mapping BAB data. The one bit data is coupled to a data reconstruction block 240 via a line L20 and the encoded mapping BAB data is fed to a binary arithmetic decoding block 230.

The binary arithmetic decoding block 230 decodes the encoded mapping BAB data by using a probability table, stored in a probability table block 220 and including the same probabilities as used in encoding the current BAB data at the encoding part, and provides a decoded mapping BAB data to the data reconstruction block 240, wherein, barring errors, the decoded mapping BAB data will be identical to the mapping BAB data generated at the mapping block 120 in FIG. 1.

The data reconstruction block 240 reconstructs the current BAB data based on the decoded mapping BAB data and the one bit data fed thereto via the line L20 from the demultiplexer 210, wherein the one bit data corresponds to the binary value of the left-top pixel of the current BAB. Therefore, if the one bit data is 1 and a mapping value of a right-hand pixel of the left-top pixel is 0, the binary value of the left-top pixel of the reconstructed current BAB is determined as 1 and the right-hand pixel follows the binary value of the left-top pixel, i.e., 1, since the mapping value 0 represents that its pixel value is identical to that of the left-top pixel. On the other hand, under the same condition, if the mapping value is 1, the pixel value of the right-hand pixel becomes 0 since, according to the mapping rules used at the encoding part, the mapping value 1 represents that two adjacent pixels have different binary values. Then, each of the remaining pixel values of the reconstructed current BAB is also determined by using its corresponding mapping value and its left-hand or right-hand pixel value depending on its scanning order. Meanwhile, with reference to the explanation of the encoding process, the leftmost pixel value is determined based on its upper pixel value and corresponding mapping value in accordance with the first embodiment of the present invention. On the other hand, in accordance with the second embodiment of the present invention, the leftmost or rightmost pixel value is decided based on its precedingly reconstructed and adjacent pixel value and corresponding mapping value along the arrow representing the scanning order. That is to say, the decoding process is dependent on the encoding process. After the current BAB data is reconstructed through the above process, the data reconstruction block 240 outputs the reconstructed BAB data having the same pattern as the current BAB data as decoded BAB data.

As illustrated above, by using the modified binary arithmetic coding technique in lieu of the conventional CAE technique, the computational complexity may be substantially reduced since, at least, the present invention need not calculate the context number for each pixel in the current BAB, and the memory size also decreases because the probability table contains only two probabilities corresponding to the mapping values 0 and 1. Furthermore, the coding efficiency can be improved since the number of the probabilities used in encoding the binary shape signal is reduced and the mapping BAB data has substantially increased number of 0's therein compared with its original BAB data.

While the present invention has been described with respect to certain preferred embodiments only, other modifications and variations may be made without departing from the spirit and scope of the present invention as set forth in the following claims.

What is claimed is:

1. A method for encoding a binary shape signal including M×N pixels with M and N being positive integers, respectively, and each pixel having one of two binary values, comprising the steps of:

(a) scanning the binary shape signal in a predetermined scanning order and providing one bit data representing a pixel value of a first scanned pixel;

(b) comparing a target pixel with its precedingly scanned and adjacent pixel, wherein the target pixel is selected among the M×N pixels;

(c) assigning one of two mapping values to the target pixel in response to the comparison result;

(d) repeating the steps (b) and (c) until all the M×N pixels are processed to thereby produce a mapping signal which includes assigned M×N mapping values corresponding to the M×N pixels in the binary shape signal;

(e) arithmetically encoding the mapping signal by using probabilities corresponding to the two mapping values to thereby produce the encoded mapping signal; and (f) multiplexing the one bit data and the encoded mapping signal to thereby generate the encoded binary shape signal.

2. The method as recited in claim 1, wherein, among the two mapping values, a first one corresponds to a higher probability than a second one and the step (c) includes the steps of:

(c1) assigning the first mapping value to the first scanned pixel;

(c2) for the remaining pixels in the binary shape signal, if a binary value of the target pixel is identical to that of its precedingly scanned and adjacent pixel, assigning the first mapping value to the target pixel; and (c3) if otherwise, assigning the second mapping value to the target pixel.

3. The method as recited in claim 2, wherein the one bit data is attached to a leftmost bit of the encoded mapping signal to thereby produce the encoded binary shape signal.

4. An apparatus for encoding a binary shape signal including M×N pixels with M and N being positive integers, respectively, and each pixel having one of two binary values, which comprises:

means for scanning the binary shape signal in a predetermined scanning order and providing one bit data representing a pixel value of a first scanned pixel;

means for comparing each of the M×N pixels with its precedingly scanned and adjacent pixel by using the scanned binary shape signal and producing a first or a second comparison signal;

means for assigning one of two mapping values to said each of the M×N pixels in response to the first or the second comparison signal and producing a mapping signal by using the assigned mapping values corresponding to the M×N pixels in the binary shape signal;

means for arithmetically encoding the mapping signal by using probabilities corresponding to the two mapping values to thereby produce the encoded mapping signal; and means for multiplexing the one bit data and the encoded mapping signal to thereby generate the encoded binary shape signal.

5. The apparatus of claim 4, wherein the comparing means produces the first comparison signal if a binary value of said each of the M×N pixels is identical to that of its precedingly scanned and adjacent pixel and the second comparison signal if otherwise.

6. The apparatus of claim 5, wherein, when a first one of the two mapping values corresponds to a higher probability than a second one, the assigning means assigns the first mapping value to the first scanned pixel and the first or the second mapping value to each of the remaining pixels in the binary shape signal in response to a corresponding comparison signal.

7. The apparatus of claim 6, wherein the one bit data is attached to a leftmost bit of the encoded mapping signal to thereby produce the encoded binary shape signal.

8. A method for decoding an encoded binary shape signal, comprising the steps of:

(a) separating the encoded binary shape signal into one bit data and an encoded mapping signal;

(b) arithmetically decoding the encoded mapping signal by using probabilities used in an encoding process to thereby produce the decoded mapping signal containing M×N mapping pixels with M and N being positive integers, respectively, each of the M×N mapping pixels having one of two mapping values; and (c) reconstructing a binary shape signal having M×N binary pixels, each pixel having one of two binary values, by using the one bit data and the decoded mapping signal, wherein the step (c) includes the steps of:

(c1) assigning the one bit data to a left-top pixel among the M×N binary pixels in the binary shape signal; and (c2) assigning said one of the two binary values to each of the remaining binary pixels in the binary shape signal by comparing a mapping value of a corresponding one of the M×N mapping pixels with a binary value of its precedingly reconstructed and adjacent binary pixel in the binary shape signal to thereby reconstruct the binary shape signal.

9. The method according to claim 8, wherein, when a first one of the two mapping values corresponds to a higher probability than a second one, if the corresponding one of the M×N mapping pixels has the first one, said each of the remaining binary pixels in the binary shape signal has a same binary value as its precedingly reconstructed and adjacent binary pixel in the binary shape signal and, if otherwise, it has a different binary value from that of the precedingly reconstructed and adjacent binary pixel.

10. An apparatus for decoding an encoded binary shape signal, which comprises:

means for demultiplexing the encoded binary shape signal to obtain one bit data and an encoded mapping signal therefrom;

means for arithmetically decoding the encoded mapping signal by using probabilities used in an encoding process to thereby produce a decoded mapping signal containing M×N mapping pixels with M and N being positive integers, respectively, each of the M×N mapping pixels having one of two mapping values; and means for reconstructing a binary shape signal having M×N binary pixels, each pixel having one of two binary values, by using the one bit data and the decoded mapping signal, wherein the reconstructing means includes:

means for assigning the one bit data to a left-top pixel among the M×N binary pixels in the binary shape signal; and means for assigning one of the two binary values to each of the remaining binary pixels in the binary shape signal by using a mapping value of a corresponding one of the M×N mapping pixels and a binary value of its precedingly reconstructed and adjacent binary pixel in the binary shape signal to thereby reconstruct the binary shape signal.

11. The apparatus of claim 10, wherein, when a first one of the two mapping values corresponds to a higher probability than a second one, if the corresponding one of the M×N mapping pixels has the first one, said each of the remaining binary pixels in the binary shape signal has a same binary value as its precedingly reconstructed and adjacent binary pixel in the binary shape signal and, if otherwise, it has a different binary value from the precedingly reconstructed and adjacent binary pixel.

* * * * *